(12) United States Patent
Kim

(10) Patent No.: US 8,249,036 B2
(45) Date of Patent: Aug. 21, 2012

(54) APPARATUS AND METHOD FOR MULTICAST AND BROADCAST SERVICE IN BROADBAND WIRELESS ACCESS SYSTEM

(75) Inventor: Ki-Back Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1240 days.

(21) Appl. No.: 11/969,582

(22) Filed: Jan. 4, 2008

(65) Prior Publication Data

US 2008/0165750 A1 Jul. 10, 2008

(30) Foreign Application Priority Data

Jan. 5, 2007 (KR) .......................... 10-2007-0001385
Jan. 12, 2007 (KR) .......................... 10-2007-0003983

(51) Int. Cl.
*H04W 4/00* (2009.01)
(52) U.S. Cl. ........................................ 370/338; 370/450
(58) Field of Classification Search .......... 370/328–329, 370/335–336, 338, 341–343, 345, 432, 437, 370/441–442, 449–450, 458–459, 465
See application file for complete search history.

(56) References Cited

U.S. PATENT DOCUMENTS

| | | | | |
|---|---|---|---|---|
| 5,371,734 A * | 12/1994 | Fischer | ........................... | 370/311 |
| 6,072,784 A * | 6/2000 | Agrawal et al. | ................ | 370/311 |
| 6,690,659 B1 * | 2/2004 | Ahmed et al. | ................. | 370/328 |
| 6,937,861 B2 * | 8/2005 | Vanghi | ............................ | 455/436 |
| 7,174,161 B2 * | 2/2007 | Nakajima et al. | .............. | 455/411 |
| 7,406,061 B2 * | 7/2008 | Harsch | ........................... | 370/328 |
| 7,489,648 B2 * | 2/2009 | Griswold | ........................ | 370/311 |
| 7,796,547 B2 * | 9/2010 | Etemad et al. | ................. | 370/328 |
| 7,864,720 B2 * | 1/2011 | Jeyaseelan | ...................... | 370/311 |
| 7,924,756 B2 * | 4/2011 | Son et al. | ........................ | 370/311 |
| 2003/0114156 A1 * | 6/2003 | Kinnavy | ........................ | 455/434 |
| 2004/0218556 A1 | 11/2004 | Son et al. | | |
| 2004/0224707 A1 * | 11/2004 | Jou | ................................ | 455/466 |
| 2005/0059437 A1 | 3/2005 | Son et al. | | |
| 2005/0128990 A1 * | 6/2005 | Eom et al. | ...................... | 370/338 |
| 2006/0019641 A1 * | 1/2006 | Vayanos et al. | ............. | 455/414.1 |

(Continued)

FOREIGN PATENT DOCUMENTS

EP 0 650 279 4/1995

(Continued)

OTHER PUBLICATIONS

"IEEE 802.16e Working Document—Part 16: Air Interface for Fixed and Mobile Broadband Wireless Access Systems; Amendment for Physical and Medium Access Control Layers for Combined Fixed and Mobile Operation in Licensed Bands", Dec. 9, 2003.

(Continued)

*Primary Examiner* — Chi H. Pham
*Assistant Examiner* — Kevin Mew
(74) *Attorney, Agent, or Firm* — The Farrell Law Firm, P.C.

(57) ABSTRACT

An apparatus and method for a Multicast and Broadcast Service (MBS) in a Broadband Wireless Access (BWA) system. In a method for operating a user terminal in a BWA system, an idle timer is driven when a flow for unicast connection has no traffic in an awake mode. Whether a broadcast service is being received is checked when the idle timer expires. The user terminal transitions from the awake mode to a fake idle mode when the broadcast service is being received.

33 Claims, 7 Drawing Sheets

U.S. PATENT DOCUMENTS

| | | | | |
|---|---|---|---|---|
| 2006/0039344 A1* | 2/2006 | Khan | ............................ | 370/345 |
| 2006/0198324 A1* | 9/2006 | Nerses et al. | .................. | 370/260 |
| 2006/0242414 A1* | 10/2006 | Corson et al. | .................. | 713/171 |
| 2007/0147284 A1* | 6/2007 | Sammour et al. | .............. | 370/328 |
| 2007/0281650 A1* | 12/2007 | Paila et al. | ..................... | 455/230 |
| 2008/0031175 A1* | 2/2008 | Fischer | ......................... | 370/311 |
| 2008/0101271 A1* | 5/2008 | Kwon et al. | ................... | 370/312 |

FOREIGN PATENT DOCUMENTS

| | | |
|---|---|---|
| JP | 2004-159297 | 6/2004 |
| JP | 2004-166198 | 6/2004 |
| JP | 2005-045350 | 2/2005 |
| JP | 2006-333040 | 12/2006 |
| KR | 1020040090846 | 10/2004 |
| KR | 1020060043401 | 5/2006 |
| KR | 1020060091132 | 8/2006 |
| WO | WO 2005/067172 | 7/2005 |
| WO | WO 2006/032405 | 3/2006 |
| WO | WO 2006/070992 | 7/2006 |

OTHER PUBLICATIONS

Cohen et al.: "On the Trade-Off Between Energy and Multicast Efficiency in 802.16e-Like Mobile Networks", Apr. 1, 2006.

* cited by examiner

APPARATUS AND METHOD FOR MULTICAST AND BROADCAST SERVICE IN BROADBAND WIRELESS ACCESS SYSTEM

PRIORITY

This application claims priority under 35 U.S.C. §119(a) to an application filed in the Korean Intellectual Property Office on Jan. 5, 2007 and allocated Serial No. 2007-1385 and an application filed in the Korean Intellectual Property Office on Jan. 12, 2007 and allocated Serial No. 2007-3983, the contents of each of which are incorporated herein by reference.

BACKGROUND OF THE INVENTION

1. Field of the Invention

The present invention relates generally to an apparatus and method for a Multicast and Broadcast Service (MBS) in a Broadband Wireless Access (BWA) system, and in particular, to an apparatus and method for simultaneously providing an MBS and a unicast service in a BWA system.

2. Description of the Related Art

As generally known in the art, communication systems have been primarily developed for voice communication services, but they are also evolving to provide data services and various multimedia services. However, conventional communication systems, which are mainly directed to providing voice communication services, still have a narrow data transmission bandwidth and require a high subscription fee. For these reasons, they cannot satisfy diversified user demands. Furthermore, in line with rapid development in the communication industry and ever-increasing demands on Internet services, it is important to provide communication systems capable of providing Internet services efficiently. As a result of these trends, BWA systems having a bandwidth large enough to both satisfy the increasing user demands and provide efficient Internet services have been proposed.

In addition to providing voice communication services, BWA systems aim at supporting a variety of low-speed and high-speed data services and multimedia application services (e.g., high-quality moving pictures) in combination. Based on wireless media using a broadband of 2 GHz (GigaHertz), 5 GHz, 26 GHz, or 60 GHz, BWA systems are able to access a Public Switched Telephone Network (PSTN), Public Switched Data Network (PSDN), Internet network, International Mobile Telecommunications-2000 (IMT-2000) network, and Asynchronous Transfer Mode (ATM) network in a mobile or stationary environment. In other words, BWA systems can support a channel transmission rate of at least 2 Mbps (Megabits per second). BWA systems may be classified into broadband wireless local loops, broadband mobile access networks, and high-speed wireless Local Area Networks (LANs) according to the terminal's mobility (stationary or mobile), communication environment (indoor or outdoor), and channel transmission rate.

The standardization of wireless access schemes of BWA systems is being conducted by Institute of Electrical and Electronics Engineers (IEEE), which is one of the international standardization organizations, particularly by the IEEE 802.16 standardization group.

Compared to conventional wireless communication systems for voice communication services, IEEE 802.16 communication systems have a larger data transmission bandwidth. Therefore, they can transmit more data for a limited period of time and share all user channels (or resources) for efficient channel utilization. Also, since Quality of Service (QoS) features are guaranteed, users can be provided with various services of different qualities depending on the characteristics of services.

Examples of principal services of the BWA systems are Internet services, Voice over Internet Protocol (VoIP) services, and nonreal-time streaming services. Recently, a Multicast and Broadcast Service (MBS) has emerged as a new real-time broadcast service. An MBS can simultaneously provide more channels while supporting mobility like a Digital Multimedia Broadcasting (DMB) service.

When an MBS is provided in an BWA system, subscribers receiving only a unicast service may coexist with subscribers receiving only the MBS. However, when there are user terminals that are in an awake (or active) mode while receiving only an MBS, a restriction may be imposed on the subscriber capacity available in the system. Furthermore, when an awake-mode MBS-receiving user terminal moves to another base station, the broadcast service may be interrupted due to a handover. This will be described in detail below.

FIG. 1 shows a state transition diagram of a user terminal in a conventional BWA system.

In FIG. 1, the state of the user terminal includes a null mode 101, an awake mode 103, a sleep mode 105, and an idle mode 107. The state transition described below can be applied to a base station as well as to the user terminal.

The null mode 101 is a state where the user terminal is powered off. When the user terminal is powered on, the user terminal establishes a wireless connection via Dynamic Service Addition (DAS) procedure and to this end, transitions to the awake mode 103. The awake mode 103 is a state where a base station applies an AMC scheme to uplink (or downlink) data of the user terminal with dynamic consideration of the channel condition.

After transition to the awake mode 103, the user terminal desiring to receive MBS reception requests broadcast contents from an MBS controller and receives broadcast contents from the MBS controller. Unless the user terminates the MBS, the user terminal operates in the awake mode 103 due to the frequent Media Access Control (MAC) message transmissions (ex: DSx) for creating and deleting connections between a Base Station (BS), where the Mobile Station (MS) in the awake or sleep mode experiences a handover procedure for mobility and load balancing.

If there is no traffic for a particular time (e.g., a sleep timer) after termination of the MBS, the user terminal transitions from the awake mode 103 to the sleep mode 105. After transition to the sleep mode 105, the user terminal checks whether there is a traffic until the expiration of an idle timer. Upon detection of the traffic, the user terminal transitions to the awake mode 103 to transmit/receive the traffic. Herein, whether there is a traffic may be checked by receiving a traffic indication (TRF-IND) message from the system during a listening period of the sleep mode.

If there is no traffic until the expiration of the idle timer, the user terminal transitions to the awake mode 103 to exchange messages with a base station and then transitions to the idle mode 107. That is, the user terminal transitions to the awake mode 103 to release a wireless connection with the base station and then transitions to the idle mode 107. The idle mode 107 is the state where the wireless connection is released but Service Flow (SF) information is retained. After transition to the idle mode 107, the user terminal checks whether there is an incoming traffic at particular periods. Upon detection of an incoming traffic, the user terminal transitions to the awake mode 103 to transmit/receive traffics. Incoming traffic may be checked by receiving a paging advertisement (PAG-ADV) message from the system during a listening period of the idle mode.

As described above, according to the standards, the sleep timer (optional) and the idle timer (mandatory) are managed by both of the user terminal and the system (i.e., the base station). If the timer expires, one of the user terminal and the base station requests a mode transition to the counterpart. Thereafter, if the counterpart makes an acknowledgement response, both of the user terminal and the base station transition to the same mode. On the other hand, if the opponent does not make an acknowledgement response, the previous state is maintained. Also, for transition from the sleep mode to the idle mode, the awake mode intervenes between the sleep mode and the idle mode. If an error occurs in the transition process for certain reason, a transition can be made to the null mode.

As described above, the conventional user terminal receiving the MBS always operates in the awake (or active) mode. In general, because at least one or more content frames are transmitted every 256 frames (i.e., 1.28 sec) in the MBS and a transmission interval is much smaller in a target broadcast channel of 64 Kbps (Kilobits per second) or more, the conventional MBS terminal cannot transition to the idle mode or the sleep mode. The following problems arise because the conventional MBS terminal always operates in the awake mode.

Firstly, there is a restriction in the subscriber capacity available in the system. In general, the BWA system restricts the maximum available number of awake-mode terminals due to a restriction in allocation of a Channel Quality Indicator (CQI) channel. The MBS can perform a scheduling operation without consideration of the wireless conditions of a user terminal or a user-terminal group. In this case, the MBS does not use an Adaptive Modulation and Coding (AMC) scheme. That is, the MBS does not need resource scheduling. Thus, the MBS need not allocate a CQI channel. However, because user terminals receiving only the MBS also operate in the awake mode, the number of awake-mode user terminals may be saturated due to the user terminals receiving only the MBS. For example, an access attempted by a new user terminal may be rejected due to the user terminals receiving only the MBS, though the system can accommodate the new user terminal.

Secondly, a handover procedure is executed when a user terminal receiving only the MBS moves between base stations, though the handover procedure is unnecessary. The execution of the unnecessary handover procedure causes a waste of air resource. In the worst case, the broadcast service may be interrupted because an initial network entry procedure is executed when the handover procedure fails.

As described above, various problems arise because user terminals receiving only an MBS operate in an awake mode.

SUMMARY OF THE INVENTION

The present invention substantially solves at least the above problems and/or disadvantages and provides at least the advantages below. Accordingly, an aspect of the present invention is to provide a state transition diagram of a user terminal considering an MBS in a BWA system.

Another aspect of the present invention is to provide an apparatus and method for simultaneously providing an MBS, which does not use an AMC scheme, and a unicast or multicast service or signaling messages, which uses an AMC scheme, in a BWA system.

Still another aspect of the present invention is to provide an apparatus and method for enabling a user terminal, which is receiving only an MBS in a BWA system, to receive a broadcast seamlessly during movement between base stations in the same broadcast zone.

Even another aspect of the present invention is to provide an apparatus and method for preventing the available subscriber capacity from being saturated due to user terminals receiving only an MBS in a BWA system.

Yet another aspect of the present invention is to provide an apparatus and method for removing a handover signaling procedure in a BWA system when a user terminal, which is receiving only a broadcast service, moves between base stations in the same broadcast zone.

According to an aspect of the present invention, an apparatus of a user terminal in a BWA system includes a timer manager for driving an idle timer when a flow for unicast connection has no traffic in an awake mode; and a state manager for checking whether a broadcast service is being received when the idle timer expires, and transitioning from the awake mode to a fake idle mode when the broadcast service is being received.

According to another aspect of the present invention, a method for operating a user terminal in a BWA system includes driving an idle timer when a flow for unicast connection has no traffic in an awake mode; checking whether a broadcast service is being received when the idle timer expires; and transitioning from the awake mode to a fake idle mode when the broadcast service is being received.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
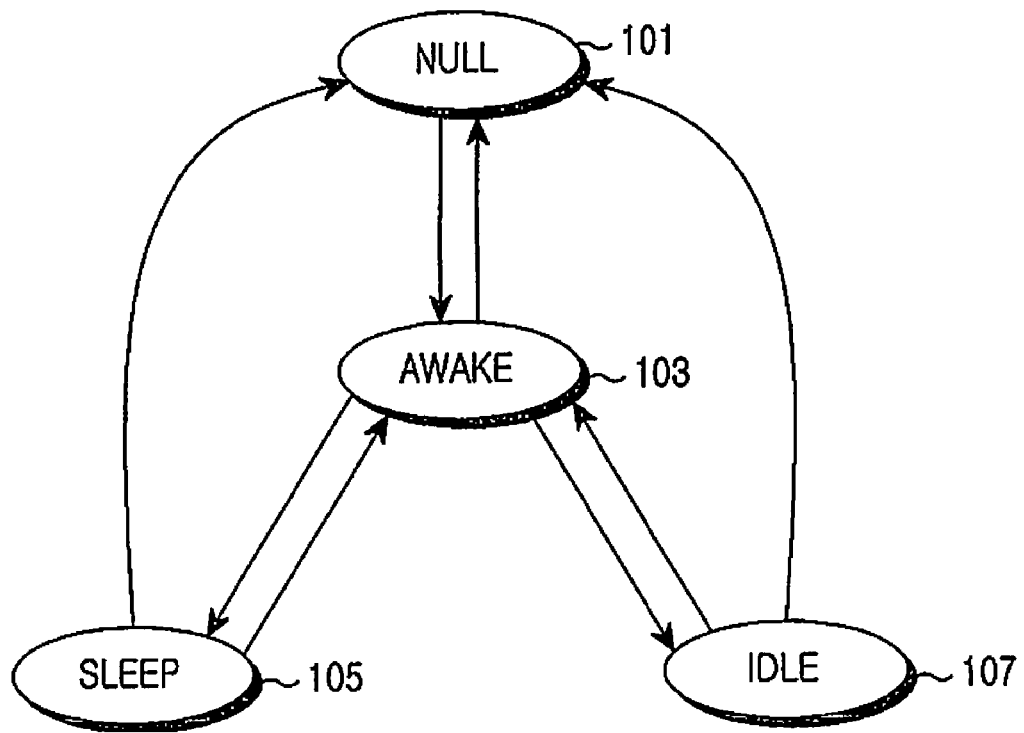
FIG. 1 is a state transition diagram of a user terminal in a conventional BWA system.

Preferred embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. Therefore, the terms used herein are to be understood based on the descriptions made herein.

The present invention provides a scheme for operating a state of a user terminal in a Broadband Wireless Access (BWA) system with consideration of a Multicast and Broadcast Service (MBS).

In an environment where user terminals receiving a unicast service coexist with user terminals receiving an MBS, a user terminal receiving only an MBS not using an Adaptive Modulation and Coding (AMC) scheme operates in a fake idle mode. In this case, because the system manages user terminals receiving only an MBS in an idle-mode, the system can prevent the number of awake-mode subscribers from being saturated due to the user terminals receiving only the MBS. Also, because a user terminal receiving only an MBS operates in a fake idle mode, an active handover procedure is not executed even when the user terminal moves between base stations in the same broadcast zone. Thus, the present invention does not cause a waste of air resource and an interruption of a broadcast service that may be caused by the execution of an unnecessary handover procedure.

In general, an awake mode is a state where a base station applies an AMC scheme to uplink (or downlink) data of a user terminal with a dynamic consideration of the wireless conditions of the user terminal. Thus, a Channel Quality Indicator (CQI) Channel (CQICH) is allocated for awake-mode user terminals. An idle mode is a state where a base station does not manage Connection Identifier (CID) resources or the wireless conditions of a user terminal.

Because an AMC scheme is applied to a unicast or signaling traffic, a user terminal communicating a unicast or signaling traffic can apparently be classified as an awake-mode user terminal. However, an AMC scheme may or may not be applied to an MBS.

For example, a broadcast service, which is a kind of MBS, is classified as a non-AMC service because the air scheduling is performed without consideration of the wireless conditions of a user terminal or a user-terminal group.

A multicast service, which is also a kind of MBS, may or may not consider the wireless conditions of a user terminal or a user-terminal group. If the wireless conditions are considered, because the multicast service is classified as an AMC-based service, the user terminal or the user-terminal group operates in the awake mode.

Thus, the present invention provides a scheme for simultaneously providing an AMC-based service (e.g., a unicast service, a multicast service and signaling traffic to and from MS) and a non-AMC service (e.g., a broadcast service and broadcast signaling).

In the following description, a user terminal, which is receiving only an MBS and operates in a fake idle mode (or a fake sleep mode), is a user terminal receiving only a non-AMC MBS traffic (broadcast service traffic). Also, a unicast service refers to an AMC-based service, a multicast service based on an AMC and signaling traffic based on an AMC considering the wireless conditions is also referred to as a unicast service.

Also, a user terminal may have a plurality of unicast connections at a time, and a timer (e.g., an idle timer and a sleep timer) is assumed to be driven when all served flows have no traffic.

In the following description, a broadcast service may be called MCBCS (MultiCast BroadCast Service), MBS (Multicast and Broadcast Service), MBMS (Multimedia Broadcast and Multicast Service), or BCMCS (BroadCast/MultiCast Service) depending on the intensions of operators and standardization groups. Also, the term of NE (Network Entity) may be defined differently depending on the intensions of operators and standardization groups. For example, a base station may be called AP (Access Point), RAS (Radio Access Station), Node B, or BS (Base Station). Also, a base station controller may be called RNC (Radio Network Controller), BSC (Base Station Controller), ACR (Access Control Router), or ASN-GW (Access Service Network-Gateway). An ANS-GW may also function as a base station controller as well as a router.

Figure 2:
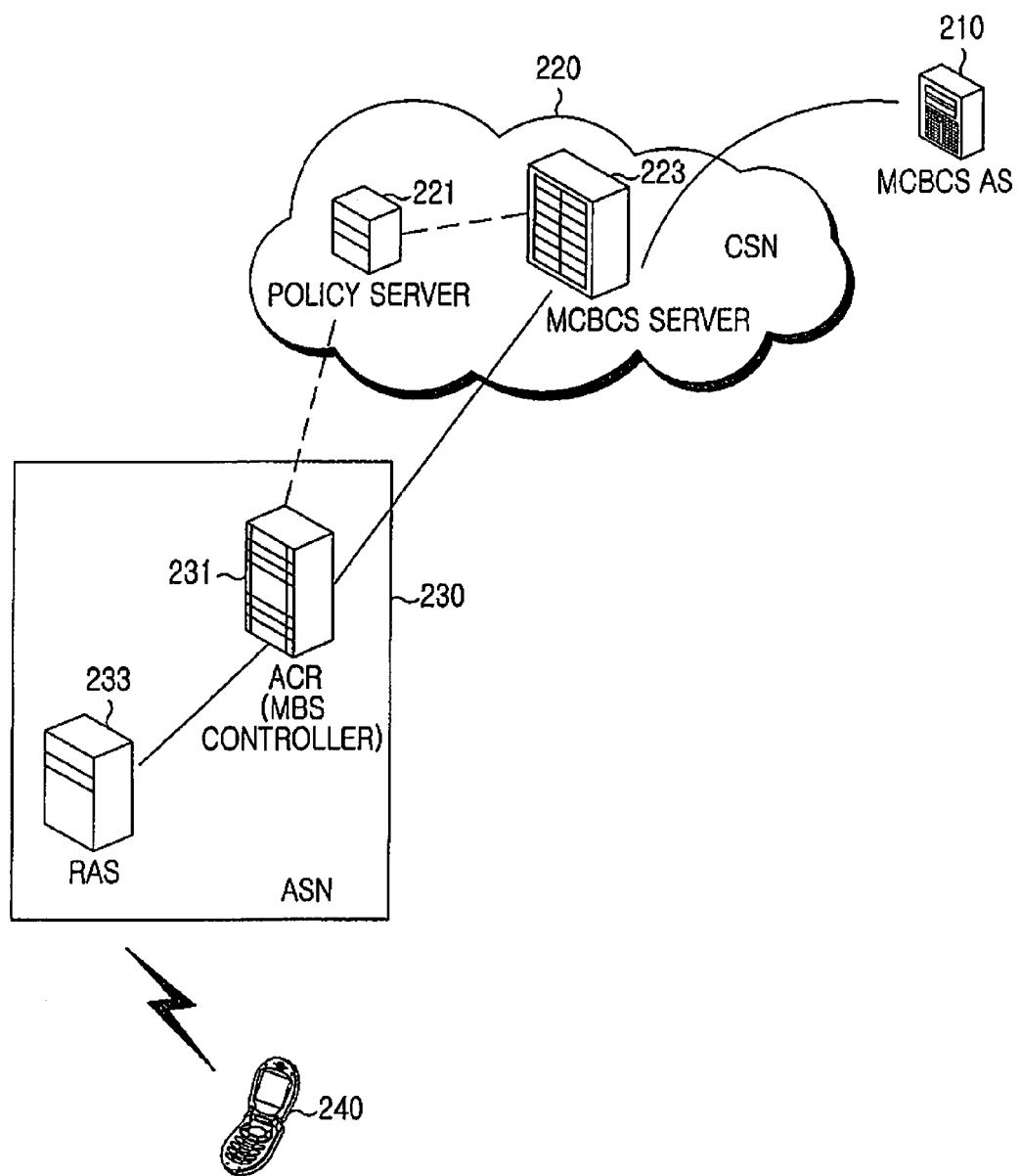
FIG. 2 is a network for providing an MBS according to the present invention.

FIG. 2 shows a network for providing an MBS according to the present invention.

In FIG. 2, the network is divided into a section managed by a Service Provider (SP) and a section managed by a network provider. The SP-managed section includes a Core Service Network (CSN) 220 and the network provider-managed section includes an Access Service Network (ASN) 230. The CSN 220 includes a policy server 221 and an MCBCS server 223. The ASN 230 includes an Access Control Router (ACR) 231 and a Radio Access Station (RAS) 233.

An MCBCS application server (MCBCS AS) 210 is managed by a SP, where NAP (Network Access Provider) can also be a SP. The MCBCS AS 210 transmits broadcast schedules (e.g., a broadcast channel Internet Protocol (IP) address and a data transmission rate) of the service provider to the MCBCS server 223. Also, the MCBCS AS 210 may perform functions such as subscription management, user authentication & authorization management, user group management, key management & distribution, content protection, stream/file transmission, user interaction, and notification or alert for informing urgent advertisement. Herein, the MCBCS AS 210 may receive service contents from an external Content Provider (CP) (not illustrated). Herein, the functions of MCBCS AS may be performed in MCBCS server.

The policy server 221 manages a Quality of Service (QoS) for each IP flow. If an MBS is triggered for a user terminal, the policy server 221 transmits triggering information to a base station system (ACR and RAS) through an interface such as Diameter, Computer Oracle and Password System (COPS), Radius, etc. Operation of the policy server 221 has no direct connection with the present invention, and thus a description of the policy server 221 will be omitted for conciseness.

The MCBCS server 223 performs a function for providing an optimal broadcast service by synthesizing the condition of an access service network and broadcast service information (e.g., broadcast schedules) received from at least one MCBCS AS 210. For example, the MCBCS server 223 manages all resources (e.g., an MBS zone and a broadcast channel identifier of a Media Access Control (MAC) layer) of an access service network related to the broadcast, and may generate a mapping table for mapping broadcast channels and identifiers of MAC layers. That is, the MCBCS server 223 may perform functions such as broadcast zone management, service guide processing/transmission, stream/file transmission, multicast group management, reception report management, etc. Herein, some functions of the MCBCS server 223 may be performed by an NE located in an ASN.

The ACR 231 transmits broadcast contents received from the MCBCS 223, the MCBCS AS 210, or other content providers to the RAS 233. An MBS controller in the ACR 231 performs data/time synchronization for received broadcast contents, and multicasts the synchronized broadcast packet to RASs within the same MBS zone. Also, the ACR 231 manages the mobility and connection of a user terminal 240, and generates a Service Flow (SF) for each of uplink/downlink connections. For example, if an MBS triggering for the user terminal 240 is reported from the policy server 221, information necessary for receipt of the corresponding SF is reported to the user terminal 240.

The RAS 233 transmits broadcast contents received from the ACR 231 to the user terminal 240. The RAS 233 is connected to the ACR 231 and is connected to the user terminal 240 in a wireless fashion. The RAS 233 allocates resources to the user terminal 240 by scheduling unicast traffics based on the MAC layer QoS. Also, the RAS 233 receives time stamping/packetization traffics (data/time synchronization packets) from the MBS controller of the ACR 231, based on the air scheduling information set by an operator with respect to MBS traffics, and bypasses/broadcasts the received traffics at the time-stamped point.

According to the present invention, the user terminal 240 manages the current mode in accordance with a particular state transition diagram. In case of receiving only an MBS, the user terminal 240 operates in a fake idle mode or a fake sleep mode in accordance with the state transition diagram. Also, the RAS 233 manages the user terminal 240 in an idle mode or a sleep mode. If the user terminal 240 moves to another RAS in the fake idle mode, a handover procedure is not executed because the system processes the corresponding MS as the idle mode. If the user terminal 240 moves to another RAS in the fake sleep mode, a handover procedure is executed by transition to an awake mode.

Figure 3:
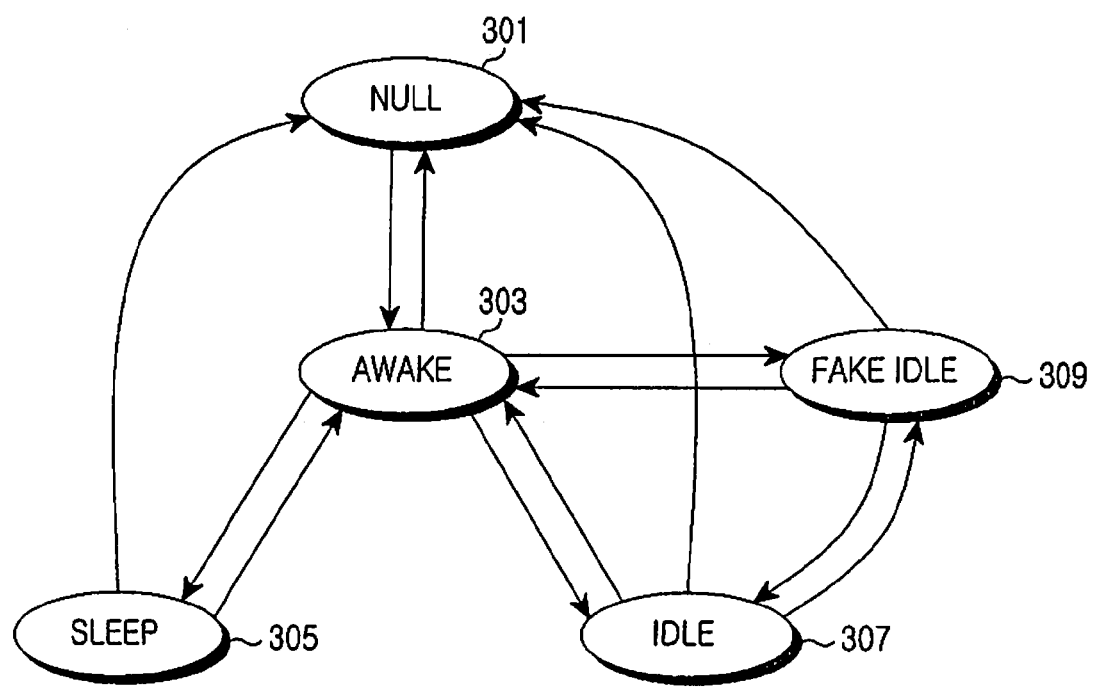
FIG. 3 is a state transition diagram of a user terminal in a BWA system according to the present invention.

FIG. 3 shows a state transition diagram of a user terminal in a BWA system according to the present invention.

In FIG. 3, the sate of the user terminal includes a null mode 301, an awake mode 303, a sleep mode 305, an idle mode 307, and a fake idle mode 309. Hereinafter, a state transition is assumed to be performed in the user terminal.

When the user terminal is powered on, the user terminal establishes a wireless connection with a base station and to this end, transitions to the awake mode 303. The awake mode 330 is a state where the user terminal and the base station actually transmit/receive traffics by using an AMC scheme. The user terminal drives a sleep timer and an idle timer that is an implementation issue. The time of the sleep timer is assumed to be greater than the time of the idle timer. Of course, the settings of the timers are implementation issues for both of the system and the user terminal. Thus, the time of the sleep timer may be greater than the time of the idle timer.

In the awake mode 303, the user terminal checks whether an idle timer for unicast connection expires. The idle timer expires when there is no traffic for unicast connection during a particular time. If the idle timer expires, the user terminal determines whether an MBS is being received. If the MBS is being received, the user terminal transitions from the awake mode 303 to the fake idle mode 309. At this point, the user terminal transitions to the fake idle mode 309 after exchanging messages for idle mode transition with the base station. Thus, the base station manages the user terminal in the idle mode. Thus, a handover procedure is not executed even when the user terminal moves between base stations. The idle mode 307 is a state where a modem of the user terminal is powered off and is unable to receive an MBS broadcast. The fake idle mode 309 is a state where a modem of the user terminal is powered on and is able to receive an MBS broadcast.

As described above, a handover procedure is not executed when the user terminal is only receiving the broadcast. Therefore, the present invention prevents air resources from being wasted due to the execution of the unnecessary handover procedure. Also, the present invention prevents a broadcast interruption that may be caused when a handover procedure fails. In general, which broadcast zone the user terminal belongs to can be detected from an MBS zone ID contained in a broadcast message (e.g., a Downlink Channel Descriptor (DCD) message and a Downlink MAP (DL MAP) message). During movement between base stations, the user terminal determines whether the corresponding base station belongs to the same broadcast zone. If the base station belongs to the same broadcast zone, the user terminal can continue to receive a broadcast service without an additional signaling procedure by using a retained service guide (e.g., a mapping table).

If the sleep timer expires in the awake mode 303, the user terminal determines whether an MBS is being received. If the MBS is not being received, the user terminal transitions to the sleep mode 305. On the other hand, if the MBS is being received, the user terminal determines whether the idle timer expires.

If a unicast traffic (uplink or downlink traffic) is generated in the fake idle mode 309, the user terminal transitions from the fake idle mode 309 to the awake mode 303 through a Quick Connection Setup (QCS) procedure. Thereafter, if an MBS is terminated in the fake idle mode 309, the user terminal transitions from the fake idle mode 309 to the idle mode 307.

The user terminal, which has transitioned from the awake mode 303 to the sleep mode 305, checks whether the idle timer expires. If the unicast traffic is detected before the expiration of the idle timer, the user terminal transitions back to the awake mode 303 to transmit/receive the traffic. If no unicast traffic is detected until the expiration of the idle timer, the base station and the user terminal transition to the awake mode 303 to exchange certain messages and then transition to the idle mode 307. That is, the base station and the user terminal release a wireless connection in the awake mode 303 and transition to the idle mode 307. The idle mode 307 is a state where the wireless connection is released but SF information is retained. In the idle mode 307, the user terminal checks whether traffic is generated. If traffic is generated, the user terminal determines whether the generated traffic is a unicast traffic or an MBS traffic. If the generated traffic is a unicast traffic, the user terminal transitions to the awake mode 303. On the other hand, if the generated traffic is an MBS traffic, the user terminal transitions to the fake idle mode 309.

According to the above-described state (or mode) transition diagram, the user terminal operates in the fake idle mode 309 and the base station manages the user terminal in the idle mode when the user terminal is receiving only an MBS. Thus, the awake mode 303 can be restricted to user terminals that actually receive a unicast service. In this case, the base station can perform connection admission control based on a number of user terminals that actually receive a unicast service. Also, a handover procedure is not executed even when a fake idle-mode user terminal moves to another base station within the same broadcast zone. Thus, the present invention prevents air resources from being wasted due to the unnecessary handover procedure. In the above-described state transition diagram, the sleep mode 305 and the idle mode 307 are traffic-free standby modes, which are also dormant modes.

Figure 4:
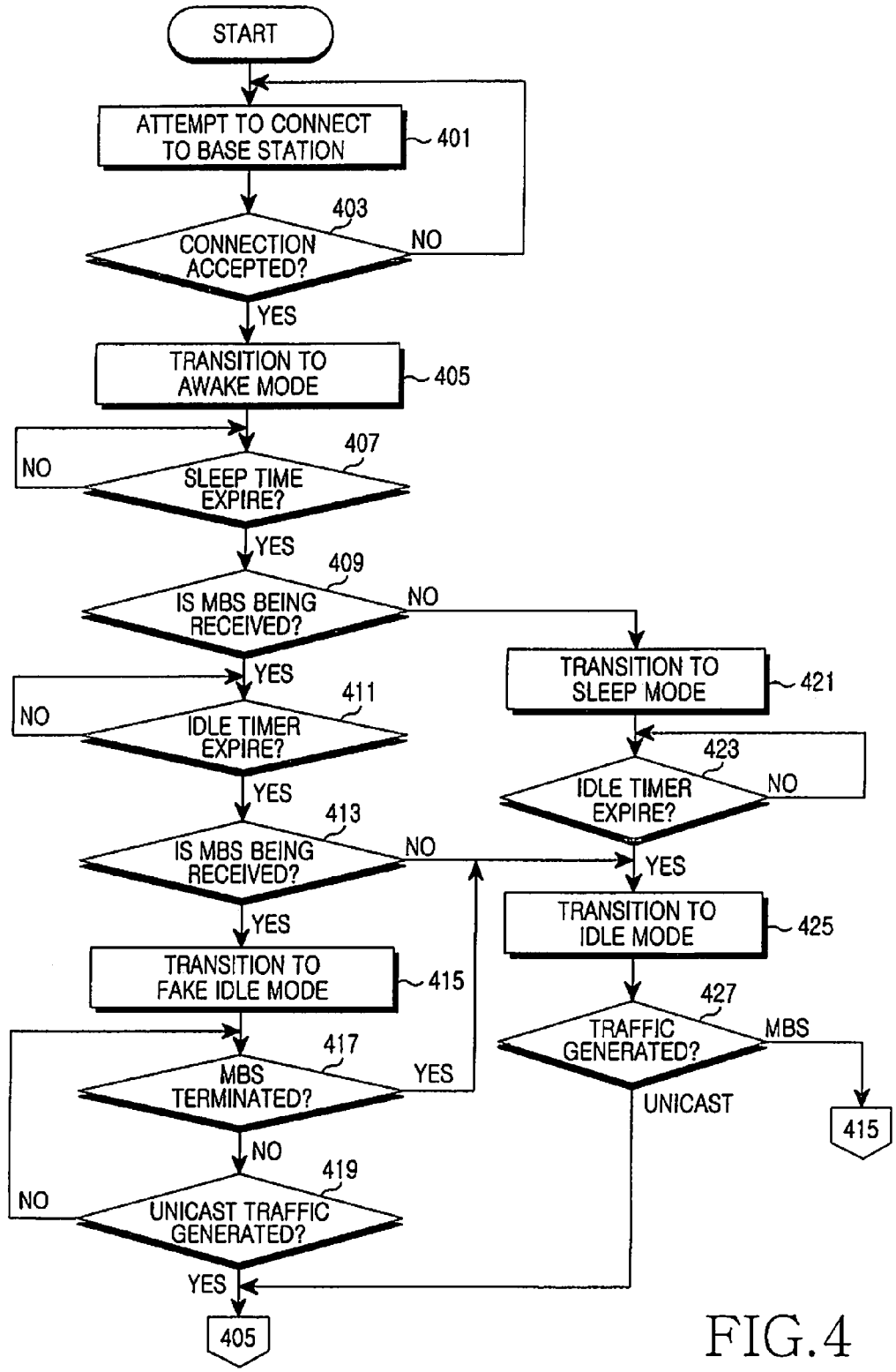
FIG. 4 is a flowchart illustrating an operation of a user terminal in a BWA system according to the present invention.

FIG. 4 shows an operation of a user terminal in a BWA system according to the present invention.

In FIG. 4, when powered on, the user terminal attempts to connect to a base station in step 401. In step 403, the user terminal determines whether the connection to the base station is accepted. If the connection to the base station is not accepted, the operation returns to step 401. On the other hand, if the connection to the base station is accepted, the operation proceeds step 405. In step 405, the user terminal transitions to an awake (or active) mode. The awake mode is a state where the user terminal and the base station transmit/receive AMC-based traffics. If a flow for unicast connection has no traffic in the awake mode, the user terminal drives a sleep timer and an idle timer. At this point, the system (e.g., the base station) also drives the sleep timer and the idle timer.

In step 407, the user terminal determines whether a sleep timer for unicast connection expires. The sleep timer expires if there is no traffic for unicast connection during a particular time. If the sleep time expires, that is, if there is no traffic for unicast connection during the particular time, the operation proceeds to step 409. In step 409, the user terminal determines whether an MBS is being received. Herein, the MBS is a non-AMC service. Some user terminals may not operate the sleep mode and in this case, the corresponding terminal do not operate the fake sleep mode.

If the MBS is being received, the operation proceeds to step 411. In step 411, the user terminal determines whether the idle timer expires. The idle timer expires if there is no traffic for unicast connection during a particular time. If the idle time expires, the operation proceeds to step 413. In step 413, the user terminal determines whether an MBS is being received.

If the MBS is being received, the operation proceeds to step 415. In step 415, the user terminal transitions from the awake mode to the fake idle mode. At this point, if the user is in the awake mode, the user terminal transitions to the fake idle mode after exchanging messages for idle mode transition with the base station. Thus, the base station manages the user terminal in the idle mode. Thus, a handover procedure is not executed even when the user terminal moves between base stations. The fake idle mode is a state where a modem of the user terminal is powered when receiving an MBS broadcast traffic.

In step 417, the user terminal determines whether the MBS is terminated. If the MBS is not terminated, the operation proceeds to step 419. In step 419, the user terminal determines whether the unicast traffic (uplink or downlink traffic) is generated. As in the idle mode, in the fake idle mode the user terminal can be periodically awaked to determine whether there is an incoming traffic. On the other hand, if the MBS is terminated in step 417, the operation proceeds to step 425. In step 425, the user terminal transitions to the idle mode. If the unicast traffic is not generated in step 419, the operation returns to step 417. On the other hand, if the unicast traffic is generated in step 419, the user terminal returns to step 405 in order to again perform the subsequent steps after transition from the fake idle mode to the awake mode.

On the other hand, if not only the unicast traffic but also the MBS is not being received in step 409, the operation proceeds to step 421. In step 421, the user terminal transitions from the awake mode to the sleep mode. In step 423, the user terminal determines whether the idle timer expires.

If the idle timer expires in step 423, the operation proceeds to step 425. In step 425, the user terminal transitions from the sleep mode to the idle mode. At this point, the user terminal transitions to the idle mode after exchanging given messages with the base station. In the idle mode, the user terminal can be periodically awaked to determine whether there is an incoming traffic. That is, in step 427, the user terminal determines whether a traffic is generated. If the traffic is generated, the user terminal determines whether the generated traffic is a unicast traffic or an MBS traffic. If the generated traffic is the MBS traffic, the user terminal transitions to the fake idle mode in step 415. On the other hand, if the generated traffic is the unicast traffic, the user terminal transitions to the awake mode in step 405.

In FIG. 4, whether the broadcast is received may be determined in various ways. For example, if the broadcast is carried only at a particular time zone in a day (e.g., from 9 a.m. to 9 p.m.), the user terminal may check the current time to determine whether the broadcast is received. In general, if the user requests a broadcast channel, an application layer transmits a MAC layer identifier of the broadcast channel to a MAC layer to command the reception of the broadcast. If the user deletes a broadcast channel, the corresponding MAC layer identifier is transmitted to command the interruption of broadcast reception. In this way, the MAC layer can determine whether a broadcast channel is being received.

Figure 5:
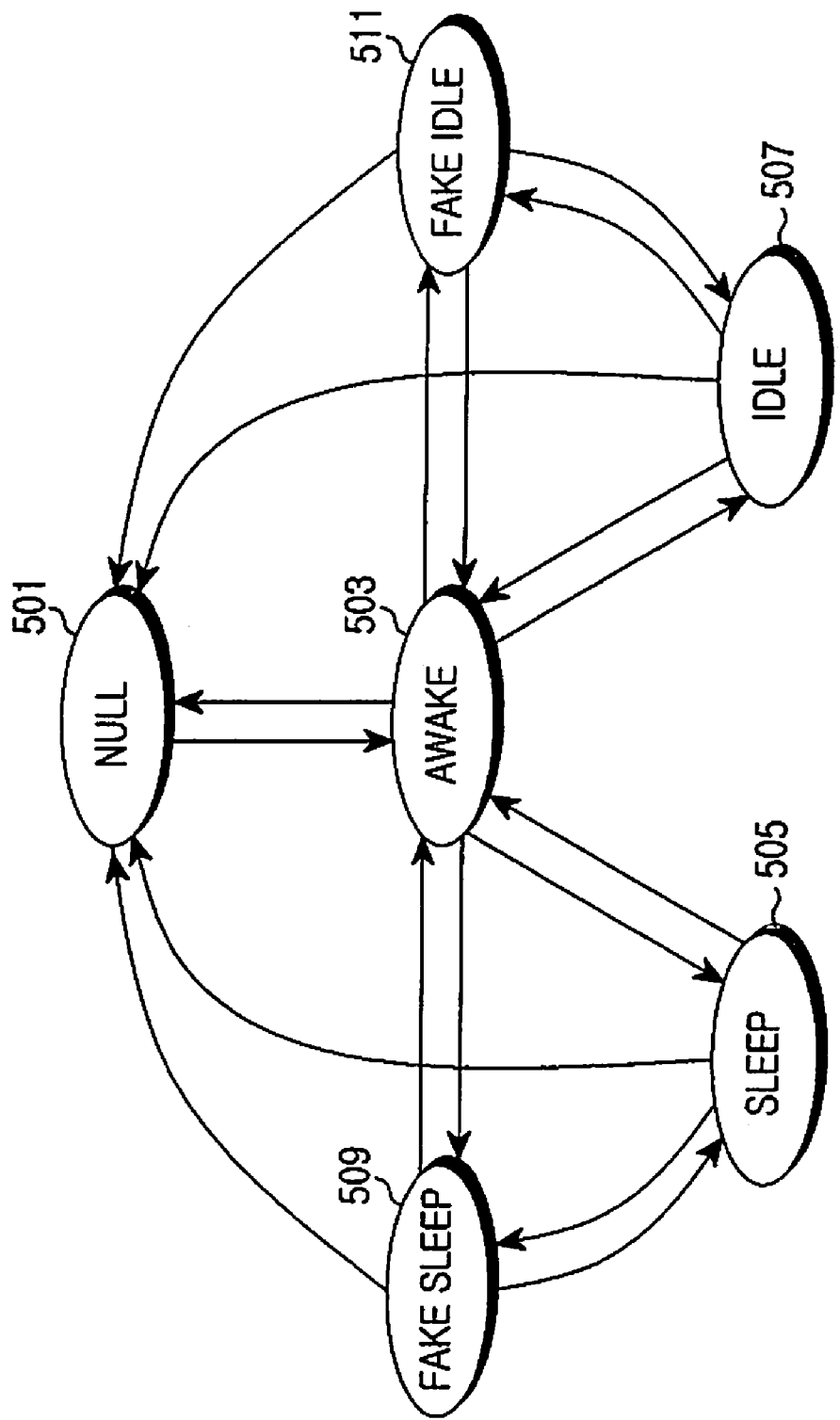
FIG. 5 is another state transition diagram of a user terminal in a BWA system according to the present invention.

FIG. 5 shows another state transition diagram of the user terminal in the BWA system according to the present invention.

In FIG. 5, the sate of the user terminal includes a null mode 501, an awake mode 503, a sleep mode 505, an idle mode 507, a fake sleep mode 509, and a fake idle mode 511. The state transition is assumed to be performed in the user terminal. When compared to the FIG. 3 state transition diagram, the FIG. 5 state transition diagram further includes the fake sleep mode 509. Thus, the following description will focus on the fake sleep mode 509.

First, a description will be given of the transition from the awake mode 503 to the fake sleep mode 509. In the awake mode 503, the user terminal checks whether a sleep timer for unicast connection expires. If the sleep timer expires, the user terminal determines whether an MBS is being received. If the MBS is being received, the user terminal transitions from the awake mode 503 to the fake sleep mode 509. At this point, the user terminal transitions to the fake sleep mode 509 after exchanging messages for sleep mode transition with the base station. Thus, the base station manages the user terminal in the sleep mode. In this case, when the user terminal moves to another base station, the user terminal transitions to the awake mode to execute a handover procedure. In general, because a modem of the user terminal is periodically powered off in the sleep mode 505, the user terminal cannot receive an MBS broadcast in the sleep mode 505. However, because the modem of the user terminal can be powered on in the fake sleep mode 509, the user terminal can receive an MBS broadcast in the fake sleep mode 509.

A description will now be given of the transition from the fake sleep mode 509 to the fake idle mode 511. In the fake sleep mode 509, the user terminal checks whether an idle timer for unicast connection expires. If the idle timer expires, the user terminal determines whether an MBS is being received. If the MBS is being received, the user terminal transitions through the awake mode 503 to the fake idle mode 511. That is, the user terminal transitions to the awake mode 503 to exchange messages for idle mode transition with the base station, and then transitions to the fake idle mode 511. Thus, the base station manages the user terminal in the idle mode. Thus, a handover procedure is not executed even when the user terminal moves to another base station. As described above, a handover procedure is not executed when the user terminal receiving only the MBS. Therefore, the present invention prevents air resources from being wasted due to the execution of the unnecessary handover procedure. Also, the present invention prevents a broadcast interruption that may be caused when a handover procedure fails.

A description will now be given of the transition from the fake sleep mode 509 to the idle mode 507. In the fake sleep mode 509, the user terminal checks whether an idle timer for unicast connection expires. If the idle timer expires, the user terminal determines whether an MBS is being received. If the MBS is not being received, the user terminal transitions through the awake mode 503 to the idle mode 507. That is, the user terminal transitions to the awake mode 503 to exchange messages for idle mode transition with the base station, and then transitions to the idle mode 507.

A description will now be given of the transition from the fake sleep mode 509 to the awake mode 503. In the fake sleep mode 509, the user terminal checks whether the idle timer expires. If a unicast traffic is generated before the expiration of the idle timer, the user terminal transitions back to the awake mode 503.

A description will now be given of the transition from the fake sleep mode 509 to the sleep mode 505. In the fake sleep mode 509, the user terminal checks whether an MBS is terminated before the expiration of the idle timer. If the MBS is terminated before the expiration of the idle timer, the user terminal transitions from the fake sleep mode 509 to the sleep mode 505.

A description will now be given of the transition from the sleep mode 505 to the fake sleep mode 509. In the sleep mode 505, the user terminal checks whether a traffic is generated. If the traffic is generated, the user terminal determines whether the generated traffic is a unicast traffic or an MBS traffic. If the generated traffic is the unicast traffic, the user terminal transitions to the awake mode 503. On the other hand, if the generated traffic is the MBS traffic, the user terminal transitions to the fake sleep mode 509.

The other state transitions are the same as those in FIG. 3, and thus their description will be omitted for conciseness.

Figure 6:
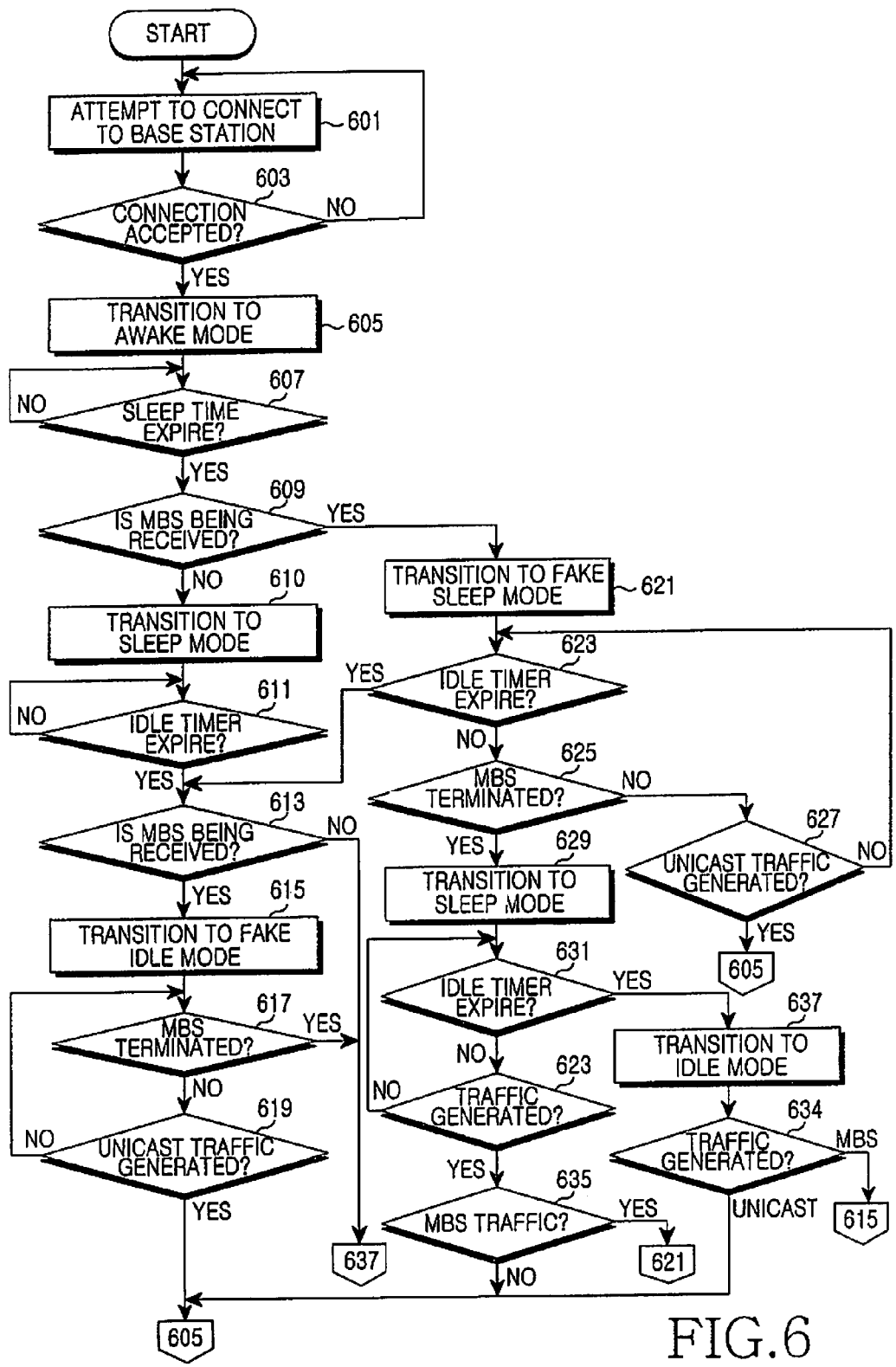
FIG. 6 is another flowchart illustrating an operation of a user terminal in a BWA system according to the present invention.

FIG. 6 shows another operation of a user terminal in a BWA system according to the present invention.

In FIG. 6, when powered on, the user terminal attempts to connect to a base station in step 601. In step 603, the user terminal determines whether the connection to the base station is accepted. If the connection to the base station is not accepted, the operation returns to step 601. On the other hand, if the connection to the base station is accepted, the operation proceeds step 605. In step 605, the user terminal transitions to an awake (or active) mode. The awake mode is a state where the user terminal and the base station transmit/receive AMC-based traffic. If a flow for unicast connection has no unicast traffic in the awake mode, the user terminal drives a sleep timer and an idle timer. At this point, the system (e.g., the base station) also drives the sleep timer and the idle timer.

In step 607, the user terminal determines whether a sleep timer for unicast connection expires. The sleep timer expires if there is no traffic for unicast connection during a particular time. If the sleep time expires, that is, if there is no traffic for unicast connection during the particular time, the operation proceeds to step 609. In step 609, the user terminal determines whether an MBS is being received. Herein, the MBS is a non-AMC broadcast service.

If the MBS is not being received in step 609, the operation proceeds to step 610. In step 610, the user terminal transitions to the sleep mode. In step 611, the user terminal determines whether the idle timer expires. The idle timer expires if there is no traffic for unicast connection during a particular time. If the idle time expires in step 611, the operation proceeds to step 613. In step 613, the user terminal determines whether an MBS is being received.

If the MBS is not being received in step 613, the operation proceeds to step 415. In step 415, the user terminal transitions from the awake mode to the fake idle mode. At this point, the user terminal transitions to the fake idle mode after exchanging messages for idle mode transition with the base station. Thus, the base station manages the user terminal in the idle mode. Thus, a handover procedure is not executed even when the user terminal moves between base stations. The fake idle mode is the state where a modem of the user terminal is powered on when receiving an MBS broadcast.

If the MBS is not being received in step 613, the operation proceeds to step 637. In step 637, the user terminal transitions to the idle mode. At this point, the user terminal transitions to the awake mode to exchange messages for idle mode transition with the base station, and then transitions to the idle mode.

If the MBS is being received in step 613, the operation proceeds to step 615. In step 615, the user terminal transitions to the fake idle mode. At this point, the user terminal transitions to the awake mode to exchange messages for idle mode transition with the base station, and then transitions to the fake idle mode. Thus, the base station manages the user terminal in the idle mode. Thus, a handover procedure is not executed even when the user terminal moves between base stations. The fake idle mode is a state where a modem of the user terminal is powered on when receiving an MBS broadcast.

In step 617, the user terminal determines whether the MBS is terminated. If the MBS is terminated in step 617, the operation proceeds to step 637. In step 637, the user terminal transitions to the idle mode. If the MBS is not terminated in step 617, the operation proceeds to step 619. In step 619, the user terminal determines whether the unicast traffic (uplink or downlink traffic) is generated. As in the idle mode, in the fake idle mode, the user terminal can be periodically awaked to determine whether there is an incoming traffic. If the unicast traffic is not generated in step 619, the operation returns to step 617. On the other hand, if the unicast traffic is generated in step 619, the user terminal returns to step 605 in order to again perform the subsequent steps after transition from the fake idle mode to the awake mode.

On the other hand, if the MBS is being received in step 609, the operation proceeds to step 621. In step 621, the user terminal transitions from the awake mode to the fake sleep mode. At this point, if the user is in the awake mode, the user terminal transitions to the fake sleep mode after exchanging messages for sleep mode transition with the base station. Thus, the base station manages the user terminal in the sleep mode.

In step 623, the user terminal determines whether the idle timer expires. If the idle timer expires in step 623, the operation proceeds to step 613. On the other hand, if the idle timer does not expire in step 623, the user terminal determines whether the MBS is terminated, in step 625. If the MBS is not terminated in step 625, the operation proceeds to step 627. In step 627, the user terminal determines whether a unicast traffic is generated. If the unicast traffic is generated in step 627, the user terminal transitions to the awake mode in step 605 and again performs the subsequent steps. On the other hand, if the unicast traffic is not generated, the user terminal returns to step 623 to again perform the subsequent steps again.

On the other hand, if the MBS is terminated in step 625, the user terminal 629 transitions from the fake sleep mode to the sleep mode in step 629. In step 631, the user terminal determines whether the idle timer expires. If the idle timer does not expire in step 631, the operation proceeds to step 633. In step 633, the user terminal determines whether traffic is generated. If traffic is not generated in step 633, the operation returns to step 631. On the other hand, if traffic is generated in step 633, the operation proceeds to step 635. In step 635, the user terminal determines whether the generated traffic is a unicast traffic or an MBS traffic. If the generated traffic is the unicast traffic in step 635, the user terminal transitions to the awake mode in step 605. On the other hand, if the generated traffic is the MBS traffic in step 635, the user terminal transitions to the fake sleep mode in step 621.

On the other hand, if the idle timer expires in step 631, the operation proceeds to step 637. In step 637, the user terminal transitions from sleep mode to the idle mode. At this point, the user terminal transitions to the awake mode to exchange messages for idle mode transition with the base station, and then transitions to the idle mode. In the idle mode, the user terminal is periodically awaked to determine whether there is an incoming traffic. That is, in step 639, the user terminal determines whether a traffic (unicast traffic or MBS traffic) is generated. If the unicast traffic is generated, the user terminal transitions from the idle mode to the awake mode in step 605. On the other hand, if the MBS traffic is generated, the user terminal transitions to the fake idle mode in step 615.

Figure 7:
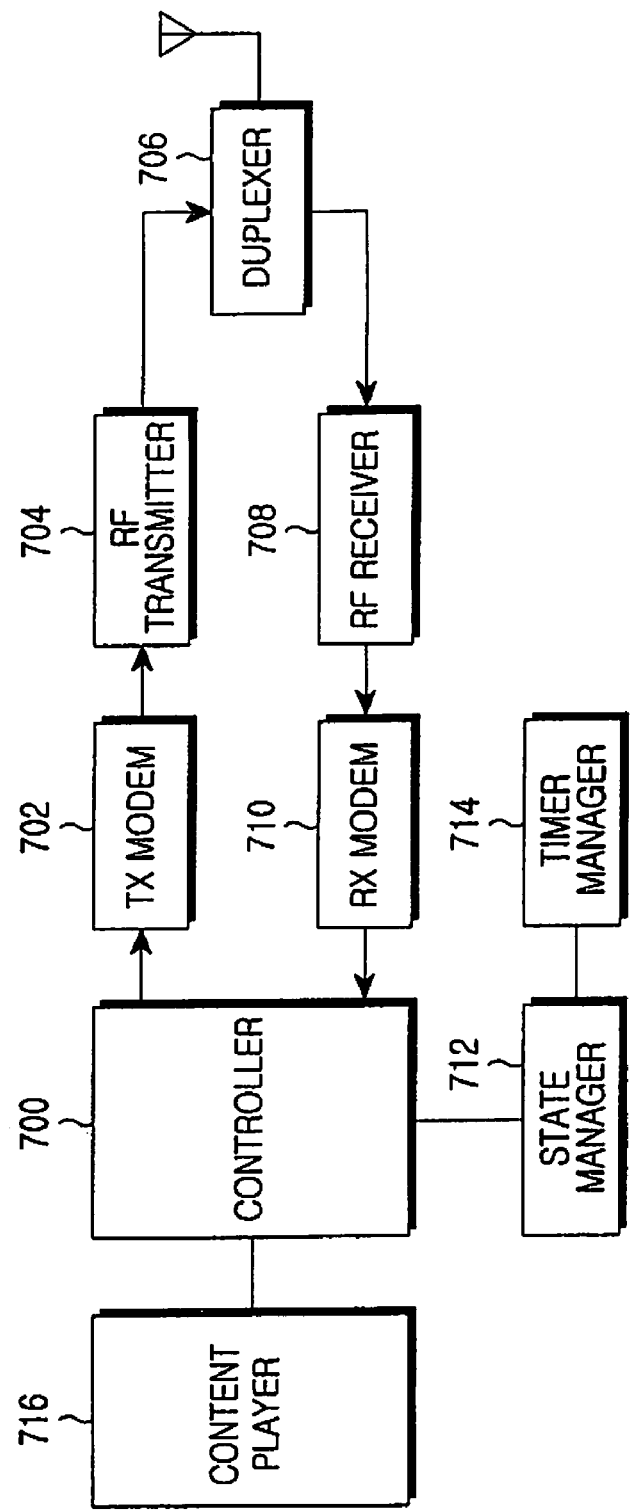
FIG. 7 is a block diagram of a user terminal according to the present invention.

FIG. 7 shows a user terminal according to the present invention.

Referring to FIG. 7, the user terminal includes a controller 700, a transmitting (TX) modem 702, a Radio Frequency (RF) transmitter 704, a duplexer 706, an RF receiver 708, a receiving (RX) modem 710, a state manager 712, a timer manager 714, and a content player 716.

The controller 700 performs an overall process/control operation for voice communication and data communication. According to the present invention, the controller 700 controls an overall operation corresponding to the state transition diagram of FIG. 3 or FIG. 5.

The TX modem 702 includes a channel coding unit and a modulation unit. The TX modem 702 baseband-modulates a message received from the controller 700. The channel coding unit includes a channel encoder, an interleaver, and a modulator. The modulation unit includes an Inverse Fast Fourier Transform (IFFT) processor for loading TX data on a plurality of orthogonal subcarriers. The above construction is for the benefit of an Orthogonal Frequency Division Multiplexing (OFDM) system. In the case of a Code Division Multiple Access (CDMA) system, the IFFT processor may be replaced with a code spreading modulator.

The RF transmitter 704 includes a frequency converter and an amplifier. The RF transmitter 704 converts baseband signals received from the TX modem 702 into RF signals. The duplexer 706 transmits TX signals (uplink signals) received from the RF transmitter 704 through an antenna, and provides RX signals (downlink signals) received from the antenna to the RF receiver 708. The RF receiver 708 includes an amplifier and a frequency converter. The RF receiver 708 converts RF signals received through a radio channel into baseband signals.

The RX modem 710 includes a demodulation unit and a channel decoding unit. The RX modem 710 baseband-demodulates signals received from the RF receiver 708. The demodulation unit includes a Fast Fourier Transform (FFT) processor. The channel decoding unit includes a demodulator, a deinterleaver, and a channel decoder.

The controller 700 protocol-processes RX data received from the RX modem 710 and reproduces the same through the corresponding application. Upon receipt of broadcast contents, the controller 700 protocol-processes the received broadcast contents and provides the resulting data to the content player 716. The content player 716 may include an audio codec and a video codec. The content player 716 reproduces the received broadcast contents and outputs the resulting signals to a speaker (not illustrated) and a display unit (not illustrated).

The state manager 712 determines the current mode based on the state transition diagram of FIG. 3 or FIG. 5. Also, the state manager 712 controls the timer manager 714 according to the determined mode. The timer manager 714 operates timers that are necessary for operation of the state transition diagram of FIG. 3 or FIG. 5. That is, under the control of the state manager 712, the timer manager 714 drives the corresponding timer. If the corresponding timer expires, the timer manager 714 reports the expiration of the timer to state manager 712. Then, the state manager 712 performs a state transition according to the expiration of the corresponding timer.

If the idle timer expires, the state manager 712 determines whether an MBS is being received. If the MBS is being received, the state manager 712 determines the fake idle mode as the current mode and reports the determination to the controller 700. Then, the controller 700 performs an operation according to the fake idle mode.

If the sleep timer expires, the state manager 712 determines whether an MBS is being received. If the MBS is being received, the state manager 712 determines the fake sleep mode as the current mode and reports the determination to the controller 700. Then, the controller 700 performs an operation according to the fake sleep mode. Also, if the idle timer expires in the fake sleep mode, the state manager 712 determines whether an MBS is being received. If the MBS is being received, the state manager 712 determines the fake idle mode as the current mode and reports the determination to the controller 700.

In the above examples, the fake sleep mode and the fake idle mode are defined separately. Alternatively, the fake sleep mode may be included in the sleep mode and the fake idle mode may be included in the idle mode.

For example, if the sleep timer for unicast connection expires, the user terminal transitions to the sleep mode and checks whether a broadcast is being received. If the broadcast is being received, the user terminal operates in the fake sleep mode included in the sleep mode.

Likewise, if the idle timer for unicast connection expires, the user terminal transitions to the idle mode and checks whether a broadcast is being received. If the broadcast is being received, the user terminal operates in the fake idle mode included in the idle mode.

In the above examples, a modem of the user terminal can be powered on for the fake idle mode and the fake sleep mode. Alternatively, the modem of the user terminal may be powered on/off for power saving.

In the case of the fake idle mode, a listening interval for receiving a paging advertisement (PAG_ADV) message is set to be very small and the rest may be set to be a sleep interval. At this point, the modem of the user terminal receiving the broadcast may be powered on/off during the sleep interval in accordance with the period of a broadcast channel. In this case, if the base station broadcasts all the broadcast channels at the same period, the on/off period of the modem of the user terminal need not be changed. Also, if the base station broadcasts all the broadcast channels at the same period, a loss due to a channel change can be reduced.

In the case of the fake sleep mode, a listening interval for receiving a traffic indication (RRF_IND) message is set. If the base station broadcasts all the broadcast channels at the same period, user terminals in the fake sleep mode request a listening & sleep interval to the base station in accordance with a broadcast transmission period and are awaked in accordance with the broadcast transmission period to receive the broadcast channel and the traffic indication message. In this case, the base station manages fake-sleep-mode user terminals receiving the broadcast as one sleep group, and may transmit the traffic indication messages for user terminals of the sleep group at a time.

The above scheme may be performed on the assumption that all the broadcast channels have the same period. If a time slicing concept is used to transmit the content in one broadcast channel in a large amount at a time and to set a broadcast transmission period to be long in seconds, user terminals receiving the same channel can be grouped as one sleep group. In this case, if the user terminal changes a channel, the user terminal changes a sleep group. In order to change the sleep group, the user terminal and the base station exchange a sleep request (SLP_REQ) message and a sleep response (SLP_RSP) message with each other. This scheme can effectively save the power of the user terminal because the broadcast period (i.e., an off period of the modem) is long in case of no channel change.

As described above, the present invention provides a scheme for operating a user terminal receiving only an MBS in a fake idle mode, in an environment where user terminals receiving a unicast service coexist with user terminals receiving an MBS. That is, because system manages user terminals receiving only an MBS in an idle-mode, the present invention prevents a number of subscribers from being saturated due to the user terminals receiving only the MBS. Also, an active handover procedure is not executed even when the user terminal in the fake idle mode moves between base stations within the same broadcast zone. Thus, the present invention prevents a waste of air resource and an interruption of the broadcast due to the handover procedure.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A broadband wireless access system, the system comprising:
   a user terminal, including:
   a timer manager for driving an idle timer when a flow for unicast connection has no traffic in an awake mode; and
   a state manager for checking whether a broadcast service is being received when the idle timer expires, and transitioning from the awake mode to a fake idle mode when the broadcast service is being received.

2. The system of claim 1, wherein the state manager transitions to an idle mode when the broadcast service is terminated in the fake idle mode.

3. The system of claim 2, wherein the state manager checks whether a traffic is generated in the idle mode, transitions to the fake idle mode when a broadcast traffic is generated, and transitions to the awake mode when a unicast traffic is generated.

4. The system of claim 1, wherein the state manager transitions to the awake mode when a unicast traffic is generated in the fake idle mode.

5. The system of claim 1, further comprising a controller for exchanging control messages for idle mode transition with a base station before transition to the fake idle mode.

6. The system of claim 5, wherein the base station manages the user terminal in an idle mode in accordance with a control message.

7. The system of claim 1, wherein the timer manager drives a sleep timer when the flow for unicast connection has no traffic in the awake mode.

8. The system of claim 7, wherein the state manager checks whether a broadcast service is being received when the sleep timer expires, transitions to a sleep mode when the broadcast service is not being received, and transitions to an idle mode when the idle timer expires in the sleep mode.

9. The system of claim 7, wherein the state manager checks whether a broadcast service is being received when the sleep timer expires, and transitions to a fake sleep mode when the broadcast service is being received.

10. The system of claim 9, further comprising a controller for exchanging control messages for sleep mode transition with a base station before transition to the fake sleep mode.

11. The system of claim 9, wherein the state manager checks whether a broadcast service is being received when the idle timer expires in the fake sleep mode, and transitions through the awake mode to the fake idle mode when the broadcast service is being received.

12. The system of claim 9, wherein the state manager transitions to the awake mode when a unicast traffic is generated in the fake sleep mode, and transitions to a sleep mode when the broadcast service is terminated in the fake sleep mode.

13. The system of claim 12, wherein the state manager checks whether a traffic is generated in the sleep mode, transitions to the fake sleep mode when a broadcast traffic is generated, and transitions to the awake mode when a unicast traffic is generated.

14. The system of claim 1, wherein the fake idle mode is a submode included in an idle mode.

15. The system of claim 1, wherein the unicast connection is a connection for an Adaptive Modulation and Coding (AMC)-based traffic, and the broadcast service is a non-AMC service.

16. A method for operating a user terminal in a broadband wireless access system, the method comprising:
   driving an idle timer when a flow for unicast connection has no traffic in an awake mode;
   checking whether a broadcast service is being received when the idle timer expires; and
   transitioning from the awake mode to a fake idle mode when the broadcast service is being received.

17. The method of claim 16, further comprising exchanging control messages for idle mode transition with a base station before transition to the fake idle mode.

18. The method of claim 17, wherein the base station manages the user terminal in an idle mode in accordance with a control message.

19. The method of claim 16, further comprising transitioning from the fake idle mode to an idle mode when the broadcast service is terminated in the fake idle mode.

20. The method of claim 19, further comprising:
   transitioning to the awake mode when a unicast traffic is generated in the idle mode; and
   transitioning to the fake idle mode when a multicast traffic is generated in the idle mode.

21. The method of claim 16, further comprising transitioning to the awake mode when a unicast traffic is generated in the fake idle mode.

22. The method of claim 16, further comprising driving a sleep timer when the flow for unicast connection has no traffic in the awake mode.

23. The method of claim 22, further comprising:
   checking whether a broadcast service is being received when the sleep timer expires;
   transitioning from the awake mode to a sleep mode when the broadcast service is not being received; and
   transitioning from the sleep mode to an idle mode when the idle timer expires in the sleep mode.

24. The method of claim 22, further comprising:
   checking whether a broadcast service is being received when the sleep timer expires; and
   transitioning from the awake mode to a fake sleep mode when the broadcast service is being received.

25. The method of claim 24, further comprising exchanging control messages for sleep mode transition with a base station before transition to the fake sleep mode.

26. The method of claim 24, further comprising:
checking whether the idle timer expires in the fake sleep mode;
checking whether a broadcast service is being received when the idle timer expires; and
exchanging messages in the awake mode and transitioning to the fake idle mode when the broadcast service is being received.

27. The method of claim 24, further comprising:
transitioning to the awake mode when a unicast traffic is generated in the fake sleep mode; and
transitioning to the sleep mode when the broadcast service is terminated in the fake sleep mode.

28. The method of claim 27, further comprising:
transitioning to the fake sleep mode when a broadcast traffic is generated in the sleep mode; and
transitioning to the awake mode when a unicast traffic is generated in the sleep mode.

29. The method of claim 26, wherein the broadcast service is a Multicast and Broadcast Service (MBS).

30. The method of claim 16, wherein the fake idle mode is a submode included in an idle mode.

31. The method of claim 16, further comprising turning on/off a modem of the user terminal in the fake idle mode in accordance with a broadcast channel transmission period.

32. The method of claim 24, further comprising turning on/off a modem of the user terminal in the fake sleep mode in accordance with a broadcast channel transmission period.

33. The method of claim 16, wherein the unicast connection is a connection for an Adaptive Modulation and Coding (AMC)-based traffic, and the broadcast service is a non-AMC service.

* * * * *